(12) United States Patent
He et al.

(10) Patent No.: US 10,585,895 B2
(45) Date of Patent: Mar. 10, 2020

(54) METHOD AND APPARATUS FOR RECONSTRUCTING STANDBY NODE DATABASE

(71) Applicant: Huawei Technologies Co., Ltd., Shenzhen (CN)

(72) Inventors: Xionghui He, Shenzhen (CN); Tizheng Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 15/377,683

(22) Filed: Dec. 13, 2016

(65) Prior Publication Data

US 2017/0091280 A1 Mar. 30, 2017

Related U.S. Application Data

(63) Continuation of application No. PCT/CN2015/083536, filed on Jul. 8, 2015.

(30) Foreign Application Priority Data

Feb. 13, 2015 (CN) .......................... 2015 1 0082880

(51) Int. Cl.
*G06F 16/24* (2019.01)
*G06F 16/2455* (2019.01)
(Continued)

(52) U.S. Cl.
CPC .......... *G06F 16/2455* (2019.01); *G06F 11/14* (2013.01); *G06F 11/1451* (2013.01);
(Continued)

(58) Field of Classification Search
CPC ......... G06F 17/30306; G06F 17/30477; G06F 11/14; G06F 11/1451; G06F 11/1469;
(Continued)

(56) References Cited

U.S. PATENT DOCUMENTS 5,649,196 A 7/1997 Woodhill et al.
5,907,849 A 5/1999 Dias et al.
(Continued)

FOREIGN PATENT DOCUMENTS

CN 101231652 A 7/2008
CN 101246535 A 8/2008
(Continued)

OTHER PUBLICATIONS

Machine Translation and Abstract of Japanese Publication No. JP2000357117, Dec. 26, 2000, 25 pages.
(Continued)

*Primary Examiner* — Alford W Kindred
*Assistant Examiner* — Tiffany Thuy Bui
(74) *Attorney, Agent, or Firm* — Conley Rose, P.C.

(57) ABSTRACT

A method and an apparatus for reconstructing a standby node database. The method includes obtaining file information of a first page-structure file in an active node database and file information of a second page-structure file in a standby node database, where the first page-structure file and the second page-structure file are data files corresponding to each other, comparing the file information of the first page-structure file with the file information of the second page-structure file to obtain a comparison result indicating whether the file information is the same, and reconstructing the standby node database according to the comparison result whether the file information is the same. In the embodiments of the present disclosure, the standby node database is reconstructed in an incremental backup manner which can shorten a time for reconstructing the standby node database.

18 Claims, 4 Drawing Sheets

---

Obtain file information of a first page-structure file in an active node database and file information of a second page-structure file in a standby node database, where the first page-structure file and the second page-structure file are data files that have a correspondence — 101

Compare the file information of the first page-structure file with the file information of the second page-structure file, to obtain a comparison result whether the file information is the same — 102

Reconstruct the standby node database according to the comparison result whether the file information is the same — 103

(51) Int. Cl.
  *G06F 16/21* (2019.01)
  *G06F 11/14* (2006.01)
  *G06F 11/20* (2006.01)

(52) U.S. Cl.
  CPC ...... *G06F 11/1469* (2013.01); *G06F 11/2082* (2013.01); *G06F 16/217* (2019.01); *G06F 11/1446* (2013.01); *G06F 2201/84* (2013.01)

(58) Field of Classification Search
  CPC ............. G06F 11/2082; G06F 11/1446; G06F 2201/84; G06F 16/217; G06F 16/2455
  See application file for complete search history.

(56) References Cited

U.S. PATENT DOCUMENTS

| | | | | |
|---|---|---|---|---|
| 6,049,853 | A | * | 4/2000 | Kingsbury ............... G06F 12/08 709/213 |
| 6,289,357 | B1 | | 9/2001 | Parker |
| 6,526,418 | B1 | * | 2/2003 | Midgley ............. G06F 11/1451 707/640 |
| 8,005,830 | B2 | * | 8/2011 | Tsunemi ............. G06F 17/2211 707/730 |
| 8,219,768 | B2 | * | 7/2012 | Nishibori ............ G06F 11/1456 711/162 |
| 8,682,844 | B2 | | 3/2014 | Auer et al. |
| 9,569,460 | B1 | * | 2/2017 | Yadav ................. G06F 11/2069 |
| 2003/0182312 | A1 | * | 9/2003 | Chen ................... G06F 11/1435 |
| 2004/0064488 | A1 | * | 4/2004 | Sinha ................... G06F 11/1451 |
| 2006/0173850 | A1 | | 8/2006 | Auer et al. |
| 2007/0192386 | A1 | * | 8/2007 | Fries ................... G06F 11/1451 |
| 2007/0206863 | A1 | * | 9/2007 | Koyama ................ G06Q 10/10 382/218 |
| 2008/0177962 | A1 | | 7/2008 | Bitar |
| 2008/0313244 | A1 | * | 12/2008 | Ito ..................... G06F 17/30377 |
| 2010/0325181 | A1 | * | 12/2010 | Skillcorn .......... G06F 17/30091 707/829 |
| 2014/0201137 | A1 | * | 7/2014 | Vibhor ................ H04L 29/0854 707/610 |
| 2016/0179867 | A1 | * | 6/2016 | Li ....................... G06F 11/1435 707/634 |

FOREIGN PATENT DOCUMENTS

| | | |
|---|---|---|
| CN | 101477486 A | 7/2009 |
| CN | 101894137 A | 11/2010 |
| CN | 102054035 A | 5/2011 |
| CN | 103077242 A | 5/2013 |
| CN | 104111937 A | 10/2014 |
| CN | 104636480 A | 5/2015 |
| JP | H07234812 A | 9/1995 |
| JP | 2000357117 A | 12/2000 |
| JP | 2001325107 A | 11/2001 |
| JP | 2002149465 A | 5/2002 |
| RU | 2208834 C2 | 7/2003 |
| WO | 2014169738 A1 | 10/2014 |

OTHER PUBLICATIONS

Machine Translation and Abstract of Japanese Publication No. JP2001325107, Nov. 22, 2001, 11 pages.
Foreign Communication From A Counterpart Application, Japanese Application No. 2017-501381, Japanese Office Action dated Nov. 14, 2017, 3 pages.
Foreign Communication From A Counterpart Application, Japanese Application No. 2017-501381, English Translation of Japanese Office Action dated Nov. 14, 2017, 3 pages.
Foreign Communication From A Counterpart Application, Russian Application No. 2017102476, Russian Office Action dated Mar. 30, 2018, 17 pages.
Machine Translation and Abstract of Chinese Publication No. CN101246535, Aug. 20, 2008, 15 pages.
Machine Translation and Abstract of Chinese Publication No. CN102054035, May 11, 2011, 11 pages.
Foreign Communication From A Counterpart Application, Chinese Application No. 201510082880.6, Chinese Search Report dated Aug. 25, 2017, 2 pages.
Foreign Communication From A Counterpart Application, Chinese Application No. 201510082880.6, Chinese Office Action dated Sep. 4, 2017, 5 pages.
Machine Translation and Abstract of Chinese Publication No. CN101477486, Jul. 8, 2009, 3 pages.
Machine Translation and Abstract of Chinese Publication No. CN104636480, May 20, 2015, 3 pages.
Machine Translation and Abstract of Chinese Publication No. CN101894137, Nov. 24, 2010, 14 pages.
Machine Translation and Abstract of Chinese Publication No. CN103077242, May 1, 2013, 8 pages.
Machine Translation and Abstract of Chinese Publication No. CN104111937, Part 1, Oct. 22, 2014, 8 pages.
Machine Translation and Abstract of Chinese Publication No. CN104111937, Part 2, Oct. 22, 2014, 4 pages.
Foreign Communication From A Counterpart Application, European Application No. 15881718.9, Extended European Search Report dated Jun. 16, 2017, 9 pages.
Foreign Communication From A Counterpart Application, PCT Application No. PCT/CN2015/083536, English Translation of International Search Report dated Nov. 10, 2015, 2 pages.
Machine Translation and Abstract of Japanese Publication No. JP2002149465, May 24, 2002, 11 pages.
Machine Translation and Abstract of Japanese Publication No. JPH07234812, Sep. 5, 1995, 12 pages.
Foreign Communication From A Counterpart Application, Japanese Application No. 2017-501381, Japanese Notice of Rejection dated Jun. 12, 2018, 3 pages.
Foreign Communication From A Counterpart Application, Japanese Application No. 2017-501381, English Translation of Japanese Notice of Rejection dated Jun. 12, 2018, 2 pages.
Machine Translation and Abstract of International Publication No. WO2014169738, Oct. 23, 2014, 31 pages.
Foreign Communication From A Counterpart Application, Japanese Application No. 2017-501381, Japanese Notice of Allowance dated Dec. 18, 2018, 3 pages.

* cited by examiner

METHOD AND APPARATUS FOR
RECONSTRUCTING STANDBY NODE
DATABASE

CROSS-REFERENCE TO RELATED
APPLICATIONS

This application is a continuation of International Application No. PCT/CN2015/083536, filed on Jul. 8, 2015, which claims priority to Chinese Patent Application No. 201510082880.6, filed on Feb. 13, 2015, both of which are hereby incorporated by reference in their entireties.

TECHNICAL FIELD

The present disclosure relates to the communications field, and more specifically, to a method and an apparatus for reconstructing a standby node database.

BACKGROUND

A database is an associated and structured data set properly stored in a storage device in a computer. A redo log stream replication technology is generally used to implement a two-node cluster hot backup of the database. An active node database sends continuously-generated redo log streams to a standby node database and the standby node database redoes the redo log streams to restore data so as to implement a hot backup. However, only limited log files are retained in the active node database. When a replication speed of the standby node database is excessively slow, redoing is excessively slow, a network is broken down, or the like, the standby node database cannot replicate a required log file from the active node database, and a stream replication mechanism stops. In this case, the standby node database needs to be reconstructed to continue to perform a stream replication.

In an existing method for reconstructing a standby node database, all data files and all log files in the active node database are replicated once to the standby node database so that a stream replication can continue after the standby node database restarts. However, when the active node database has a large data amount, this method for reconstructing a standby node database may be time-consuming and cause extremely high network resource consumption.

SUMMARY

Embodiments of the present disclosure provide a method and an apparatus for reconstructing a standby node database, which can shorten a time for reconstructing a standby node database.

According to a first aspect, a method for reconstructing a standby node database is provided, including obtaining file information of a first page-structure file in an active node database and file information of a second page-structure file in a standby node database, where the first page-structure file and the second page-structure file are data files corresponding to each other, comparing the file information of the first page-structure file with the file information of the second page-structure file to obtain a comparison result whether the file information is the same, and reconstructing the standby node database according to the comparison result whether the file information is the same.

With reference to the first aspect, in an implementation manner of the first aspect, reconstructing the standby node database according to the comparison result whether the file information is the same includes, when the comparison result whether the file information is the same is that the file information of the first page-structure file is different from the file information of the second page-structure file, replacing the second page-structure file with the first page-structure file.

With reference to the first aspect and the foregoing implementation manner of the first aspect, in another implementation manner of the first aspect, the file information includes a file size and comparing the file information of the first page-structure file with the file information of the second page-structure file is comparing a file size of the first page-structure file with a file size of the second page-structure file.

With reference to the first aspect and the foregoing implementation manners of the first aspect, in another implementation manner of the first aspect, when a comparison result of the file sizes is different, reconstructing the standby node database is replacing all pages in the second page-structure file with all pages in the first page-structure file.

With reference to the first aspect and the foregoing implementation manners of the first aspect, in another implementation manner of the first aspect, the file information includes a page quantity and comparing the file information of the first page-structure file with the file information of the second page-structure file is comparing a page quantity of the first page-structure file with a page quantity of the second page-structure file.

With reference to the first aspect and the foregoing implementation manners of the first aspect, in another implementation manner of the first aspect, when a comparison result of the page quantities is different, reconstructing the standby node database is replacing all pages in the second page-structure file with all pages in the first page-structure file.

With reference to the first aspect and the foregoing implementation manners of the first aspect, in another implementation manner of the first aspect, when the comparison result of the file information is same, reconstructing the standby node database is comparing one by one version information of each page in the first page-structure file with version information of each page in the second page-structure file, and for pages of different page version information, replacing a corresponding page in the second page-structure file with a page in the first page-structure file.

With reference to the first aspect and the foregoing implementation manners of the first aspect, in another implementation manner of the first aspect, the page version information includes a log file location or a logical system timestamp.

With reference to the first aspect and the foregoing implementation manners of the first aspect, in another implementation manner of the first aspect, before reconstructing the standby node database according to the comparison result whether the file information is the same, the method further includes determining that the active node database supports a replication relationship and a process of the standby node database is normally disabled.

With reference to the first aspect and the foregoing implementation manners of the first aspect, in another implementation manner of the first aspect, when the comparison result whether the file information is the same is same and a comparison result of the page version information is same, the second page-structure file is not modified.

According to a second aspect, an apparatus for reconstructing a standby node database is provided, where the apparatus includes an obtaining unit configured to obtain file information of a first page-structure file in an active node database and file information of a second page-structure file in a standby node database, where the first page-structure file and the second page-structure file are data files corresponding to each other, a comparison unit configured to compare the file information of the first page-structure file with the file information of the second page-structure file that are obtained by the obtaining unit, to obtain a comparison result whether the file information is the same, and a reconstruction unit configured to reconstruct the standby node database according to the comparison result whether the file information is the same and that is obtained by the comparison unit.

With reference to the second aspect, in an implementation manner of the second aspect, the reconstruction unit is configured to, when the comparison result whether the file information is the same is that the file information of the first page-structure file is different from the file information of the second page-structure file, replace the second page-structure file with the first page-structure file.

With reference to the second aspect and the foregoing implementation manner of the second aspect, in another implementation manner of the second aspect, the file information includes a file size and the comparison unit is configured to compare a file size of the first page-structure file with a file size of the second page-structure file.

With reference to the second aspect and the foregoing implementation manners of the second aspect, in another implementation manner of the second aspect, when a comparison result of the file sizes obtained by the comparison unit is different, the reconstruction unit is configured to replace all pages in the second page-structure file with all pages in the first page-structure file.

With reference to the second aspect and the foregoing implementation manners of the second aspect, in another implementation manner of the second aspect, the file information includes a page quantity and the comparison unit is configured to compare a page quantity of the first page-structure file with a page quantity of the second page-structure file.

With reference to the second aspect and the foregoing implementation manners of the second aspect, in another implementation manner of the second aspect, when a comparison result of the page quantities obtained by the comparison unit is different, the reconstruction unit is configured to replace all pages in the second page-structure file with all pages in the first page-structure file.

With reference to the second aspect and the foregoing implementation manners of the second aspect, in another implementation manner of the second aspect, when the comparison result of the file information is same, the reconstruction unit is configured to compare one by one version information of each page in the first page-structure file with version information of each page in the second page-structure file, and for pages of different page version information, replace a corresponding page in the second page-structure file with a page in the first page-structure file.

With reference to the second aspect and the foregoing implementation manners of the second aspect, in another implementation manner of the second aspect, the page version information includes a log file location or a logical system timestamp.

With reference to the second aspect and the foregoing implementation manners of the second aspect, in another implementation manner of the second aspect, the apparatus further includes a determining unit and the determining unit is configured to, before the reconstruction unit reconstructs the standby node database according to the comparison result whether the file information is the same, further determine that the active node database supports a replication relationship and a process of the standby node database is normally disabled.

With reference to the second aspect and the foregoing implementation manners of the second aspect, in another implementation manner of the second aspect, when the comparison result whether the file information is the same and that is obtained by the comparison unit is same and a comparison result of the page version information is same, the reconstruction unit is configured to skip modifying the second page-structure file.

In the embodiments of the present disclosure, during reconstruction of a standby node database, file information of a first page-structure file in an active node database and file information of a second page-structure file in the standby node database are obtained and compared to determine whether the file information is the same, and the standby node database is reconstructed according to a comparison result, thereby avoiding extremely high network resource consumption brought because the standby node database is reconstructed in a full backup manner when there is a large data amount in the active node database and shortening a time for reconstructing the standby node database.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are a part rather than all of the embodiments of the present disclosure. All other embodiments obtained by a person of ordinary skill in the art based on the embodiments of the present disclosure without creative efforts shall fall within the protection scope of the present disclosure.

Figure 1:
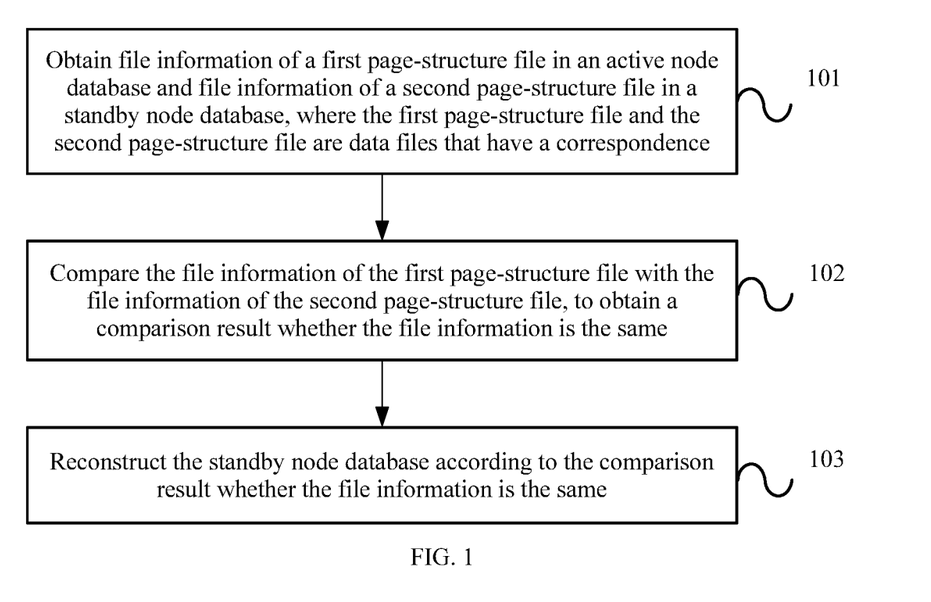
FIG. 1 is a schematic flowchart of a method for reconstructing a standby node database according to an embodiment of the present disclosure.

FIG. 1 is a schematic flowchart of a method for reconstructing a standby node database according to an embodiment of the present disclosure.

Step 101: Obtain file information of a first page-structure file in an active node database and file information of a second page-structure file in a standby node database, where the first page-structure file and the second page-structure file are data files corresponding to each other.

Step 102: Compare the file information of the first page-structure file with the file information of the second page-structure file to obtain a comparison result indicating whether the file information is the same.

Step 103: Reconstruct the standby node database according to the comparison result indicating whether the file information is the same.

In this embodiment of the present disclosure, during reconstruction of a standby node database, file information of a first page-structure file in an active node database and file information of a second page-structure file in the standby node database are obtained and compared to determine whether the file information is the same. The standby node database is reconstructed according to a comparison result, thereby avoiding extremely high network resource consumption brought because the standby node database is reconstructed in a full backup manner when there is a large data amount in the active node database and shortening a time for reconstructing the standby node database.

The standby node database may obtain the file information of the first page-structure file in the active node database and the file information of the second page-structure file in the standby node database. The first page-structure file and the second page-structure file are data files corresponding to each other. The first page-structure file may be any page-structure file of data files in the active node database. The active node database may read version information of a page-structure file from local data files and then send the version information of the page-structure file to the standby node database. The standby node database may further read version information of the second page-structure file that is corresponding to a location of the first page-structure file of the data files in the active node database and is of data files in the standby node database. The location correspondence herein may be that file locations are the same, for example, the location of the first page-structure file in the active node database is the same as a location of the second page-structure file in the standby node database.

Files in a database include a data file and a log file. During reconstruction of the standby node database, the data file and the log file need to be completely reconstructed. When both the two parts, the data file and the log file, in the active node database are completely replicated, it indicates that the standby node database is completely reconstructed. The log file tracks an execution record of a structured query language (SQL) each time, to record an update operation of the database. The log file includes information required to restore all transactions in the database.

The data file in the active node database or in the standby node database may include both a page-structure file and a non-page-structure file. The page-structure file is stored and managed by using a page as a smallest unit.

It should be understood that, the file information in this embodiment of the present disclosure may be a file size, a page quantity of a file, or page version information of a file. This embodiment of the present disclosure does not impose a limitation on the file information.

When the file information of the first page-structure file is different from the file information of the second page-structure file, the second page-structure file may be replaced with the first page-structure file. For example, a file in the standby node database may be replaced with a page-structure file in the active node database, where a location of the file is corresponding to a location of the page-structure file. It should be understood that when there is no file in the standby node database corresponding to the page-structure file in the active node database, the file in the active node database may be directly replicated to a corresponding location in the standby node database. This case also falls within the protection scope of the present disclosure.

File sizes in the database may be the same. Whether files are the same may be determined by comparing file sizes, or by comparing page quantities of the files, or by comparing page version information of the files.

When the file information is the file size, comparing the file information of the first page-structure file with the file information of the second page-structure file is comparing a file size of the first page-structure file with a file size of the second page-structure file. For example, when a size of a file in the active node database and a size of a file in the standby node database are the same (for example, both are 8 kilobytes (k)), the two files may be considered as the same. In this case, the file in the standby node database is not to be modified. When a size of a file in the active node database and a size of a file in the standby node database are different, the two files may be considered as different and the corresponding file in the standby node database may be replaced with the file in the active node database. For example, all pages of the corresponding file in the standby node database are replaced with all pages of the file in the active node database.

When the file information is the page quantity, comparing the file information of the first page-structure file with the file information of the second page-structure file is comparing a page quantity of the first page-structure file with a page quantity of the second page-structure file. For example, when a page quantity of a file in the active node database and a page quantity of a file in the standby node database are the same (for example, a first file in the active node database includes six pages and a second file in the standby node database includes six pages, where locations of the first file and the second file are the same in the two databases), the two files may be considered as the same. In this case, the file in the standby node database is not to be modified. When a page quantity of a file in the active node database and a page quantity of a file in the standby node database are different, the two files may be considered as different and the file in the standby node database may be replaced with the file in the active node database. For example, all pages of the file in the standby node database are replaced with all pages in the active node database.

When the file information is the page version information, comparing the file information of the first page-structure file with the file information of the second page-structure file is comparing page version information of the first page-structure file with page version information of the second page-structure file. Page version information of each page of a page-structure file in the active node database may be compared with page version information of each page of a page-structure file at a corresponding location in the standby node database. When version information of each page of the file in the active node database is the same as version information of each page of the file in the corresponding standby node database, the two files may be considered as the same. In this case, the file in the standby node database is not to be modified. When version information of a page of a file in the active node database is different from version information of a page of a file in the corresponding standby node database, the page in the standby node database may be replaced with the page in the active node database. It should be understood that when page quantities are the same, for pages that are different, a page in the standby node database may be replaced with a page in the active node database. When page quantities are different, for example, when a page in the active node database has no corresponding page in the standby node database, the page in the active node database may be replicated to a corresponding location in the standby node database. This case still falls within the protection scope of the present disclosure.

It should be understood that the foregoing three types of file information, the file size, the page quantity of the file, and the page version information of the file, may be combined randomly to determine whether the page-structure file in the active node database is the same as the page-structure file in the corresponding standby node database. Details are not further described one by one herein.

When the file information of the first page-structure file is the same as the file information of the second page-structure file, content of the first page-structure file may be considered as the same as content of the second page-structure file. When the file information of the first page-structure file is different from the file information of the second page-structure file, the content of the first page-structure file may be considered as different from the content of the second page-structure file.

Reconstructing the standby node database according to the comparison result indicating whether the file information is the same includes, when the comparison result whether the file information is the same is that the file information of the first page-structure file is different from the file information of the second page-structure file, replacing the second page-structure file with the first page-structure file.

When the comparison result indicates the file information of the first page-structure file is the same as the file information of the second page-structure file, the second page-structure file is not to be modified, for example, the second page-structure file in the standby node database is retained. Replacing a second file with a first file may be entirely replicating the first file and replacing entire content of the second file with entire content of the first file. When a page quantity of the first file is different from a page quantity of the second file, an entire replacement of the file may be performed likewise.

Replacing the second file with the first file may further include comparing a first page of the first file with a first page of the second file. When the first page of the first file is the same as the first page of the second file, the first page of the second file is not to be modified. When the first page of the first file is different from the first page of the second file, the first page of the second file is replaced with the first page of the first file. Each page of the first file is compared with each page of the second file so that the page is not replicated when the pages are the same, and therefore, network resource consumption of reconstructing the standby node database can be reduced.

The first page of the first file is a page of the page-structure file of the data file in the active node database. The first page of the second file is a page of the page-structure file in the standby node database. A location of the first page of the first file and a location of the first page of the second file are the same in data files in the two databases. The data file in the database includes at least one file, where the data file may be a page-structure file or a non-page-structure file. The page-structure file is stored and managed by using a page as a smallest unit. A page of the page-structure file includes version information. Generally, the version information is a location or a time identifier in a page change history. The version information may gradually increase with an update of the page. Generally, if version information of pages is the same, content of the pages may be considered as the same. If version information of pages is different, content of the pages may be considered as different. When content of the first page of the first file is different from content of the first page of the second file, the first page of the second file may be replaced with the first page of the first file. For example, the first page of the file in the active node may be replicated to replace the first page of the second file. When the content of the first page of the first file is the same as the content of the first page of the second file, the first page of the second file may not be modified, for example, the first page of the second file may not be replaced with the first page of the file in the active node.

For example, when a version number of a page of a file in the active node database is the same as a version number of a corresponding page of a corresponding file in the corresponding standby node database, the page of the file in the standby node database is not to be modified. When a version number of a page of a file in the active node database is different from a version number of a corresponding page of a corresponding file in the corresponding standby node database, the page of the file in the standby node database is replaced with the page of the file in the active node database.

Determining whether pages are the same is not limited in this embodiment of the present disclosure. For example, whether pages are the same may be determined by using version numbers of the pages. However, the present disclosure is not limited thereto.

It should be understood that replacing, in this embodiment, of the present disclosure may further include adding or deleting. When the standby node database does not include the second file (for example, in a process of a two-node cluster hot backup, the standby node cannot follow the active node and does not replicate the first file in the active node), the first file is added to a location that is in the standby node database and is corresponding to the first file in the active node database. When the standby node database includes more files than the active node database, a redundant file is deleted. The foregoing cases all fall within the coverage scope in this embodiment of the present disclosure.

In this embodiment of the present disclosure, a standby node database is reconstructed in an incremental backup manner. The standby node database is reconstructed by comparing file information of page-structure files of data files, only a changed file in an active node database and in the standby node database needs to be replicated, and a same file does not need to be replicated. Therefore, a time for reconstructing the standby node database can be shortened and network resource consumption can be reduced.

In this embodiment of the present disclosure, a standby node database is reconstructed in an incremental backup manner. An active node database no more needs to transmit all data to the standby node database so that a time for reconstructing the standby node database is shortened and network resource consumption on the active node can further be reduced.

Optionally, in an embodiment of the present disclosure, the page version information may include at least one of a log file location or a logical system timestamp.

Optionally, in an embodiment of the present disclosure, before the standby node database is reconstructed according to the comparison result indicating whether the file information is the same, the method further includes determining that the active node database supports a replication relationship and a process of the standby node database is normally disabled.

Optionally, in an embodiment of the present disclosure, when the active node database does not support a replication relationship or a process of the standby node database is abnormally disabled, the data file in the standby node database is overwritten by the data file in the active node database.

Before the standby node database is reconstructed, whether the active node database supports the replication relationship may be determined. Before the standby node database is reconstructed, whether the process of the standby node database is normally disabled may further be determined. When the active node database supports the replication relationship, or when the process of the standby node database is normally disabled, the standby node database may be reconstructed according to the file information of the first page-structure file and the file information of the second page-structure file so that accuracy of reconstructing the standby node database can be improved. When the active node database supports the replication relationship and the standby node database is normally disabled, accuracy of reconstructing the standby node database may further be improved by reconstructing the standby node database according to the file information of the first page-structure file and the file information of the second page-structure file. When the active node database does not support the replication relationship or the process of the standby node database is abnormally disabled, the standby node database is reconstructed in a full backup manner. The data file in the standby node database is overwritten by the data file in the active node database and a log file in the standby node database is overwritten by a log file in the active node database.

When the active node database enables a Nologging mode or the data file in the standby node database is not from the active node database, the active node database does not support the replication relationship. If the data file in the standby node database is not from the active node database, it may be considered that the standby node database does not match the active node database, and therefore, the active node database does not support the replication relationship. For example, an identifier of the active node database is not consistent with an identifier of the standby node database.

It should be understood that how to determine that the active node database does not support the replication relationship is not limited in this embodiment of the present disclosure. For example, when the active node database does not match the standby node database, it may be considered that the active node database does not support the replication relationship.

The active node database may enable the Nologging mode to upgrade an application database. Therefore, the standby node database cannot learn whether the active node database is modified or which modification is made to the active node database. In this case, the standby node database cannot be reconstructed in the incremental backup manner. If the active node database once enabled the Nologging mode, it may be considered that the active node database does not support the replication relationship.

When the active node database does not support the replication relationship, the standby node database cannot be reconstructed in the incremental backup manner, but needs to be reconstructed in the full backup manner. All data files and all log files in the active node database are replicated to the standby node database, that is, data files in the standby node database are overwritten by the data files in the active node database, and log files in the standby node database are overwritten by the log files in the active node database.

The standby node database further includes a control file, where the control file in the standby node database may record status information of the standby node database. The standby node database may learn, according to the status information, whether the standby node database is normally disabled. How to determine whether the standby node database is normally disabled is not limited in this embodiment of the present disclosure.

When the process of the standby node database is abnormally disabled, a partial write page may exist, and in this case, whether content of a page in the active node database and content of a page in the corresponding standby node database are the same cannot be determined by comparing page version information. Therefore, when the process of the standby node database is abnormally disabled, the standby node database cannot be reconstructed in the incremental backup manner, but needs to be reconstructed in the full backup manner. All the data files and all the log files in the active node database are replicated to the standby node database, for example, the data files in the standby node database are overwritten by the data files in the active node database and the log files in the standby node database are overwritten by the log files in the active node database.

A sequence of the two determining steps, whether the active node database supports the replication relationship and whether the standby node database is normally disabled, may be interchanged. The sequence of determining whether the active node database supports the replication relationship and determining whether the standby node database is normally disabled is not limited in this embodiment of the present disclosure. When the active node database does not support the replication relationship or the process of the standby node database is abnormally disabled, the standby node database may be reconstructed in the full backup manner. When the active node database supports the replication relationship, or when the standby node database is normally disabled, or when the active node database supports the replication relationship and the standby node database is normally disabled, the standby node database may be reconstructed in the incremental backup manner.

The data file in the active node database or in the standby node database may include both a page-structure file and a non-page-structure file. For the non-page-structure file of the data file, the standby node database cannot be reconstructed by comparing the page version information, but can be reconstructed by directly replacing a non-page-structure file of a corresponding location of a data file in the corresponding standby node database with a non-page-structure file of a data file in the active node database.

Optionally, in an embodiment of the present disclosure, when a data file in the active node database includes a non-page-structure file, a non-page-structure file of a data file in the standby node database is replaced with the non-page-structure file of the data file in the active node database. The active node database further includes a log file. During reconstruction of the standby node database, a log file in the standby node database may be replaced with the log file in the active node database.

In this embodiment of the present disclosure, a high-performance method for reconstructing a standby node database is provided. File information of a first page-structure file of a data file in an active node database is compared with file information of a second page-structure file of a data file in a standby node database. When the file information of the first page-structure file is the same as the file information of the second page-structure file, content of the two pieces of file information may be considered as the same and a page of the page-structure file of the data file in the standby node database is not modified, thereby reducing a data amount that needs to be transmitted so that a time for reconstructing the standby node database can be shortened, availability of a database system is improved, and reconstruction performance of the standby node database can be further enhanced.

During reconstruction of the standby node database, when both parts, the data file and the log file, in the active node database are completely replicated, it indicates that the standby node database is completely reconstructed. The log file tracks an execution record of a SQL each time to record an update operation of the database. The log file includes information required to restore all transactions in the database.

When the standby node database is completely reconstructed, the standby node database may be started up and a replication relationship between the active node database and the standby node database is established again to continue a communication process such as a two-node cluster hot backup of the database.

Figure 2:
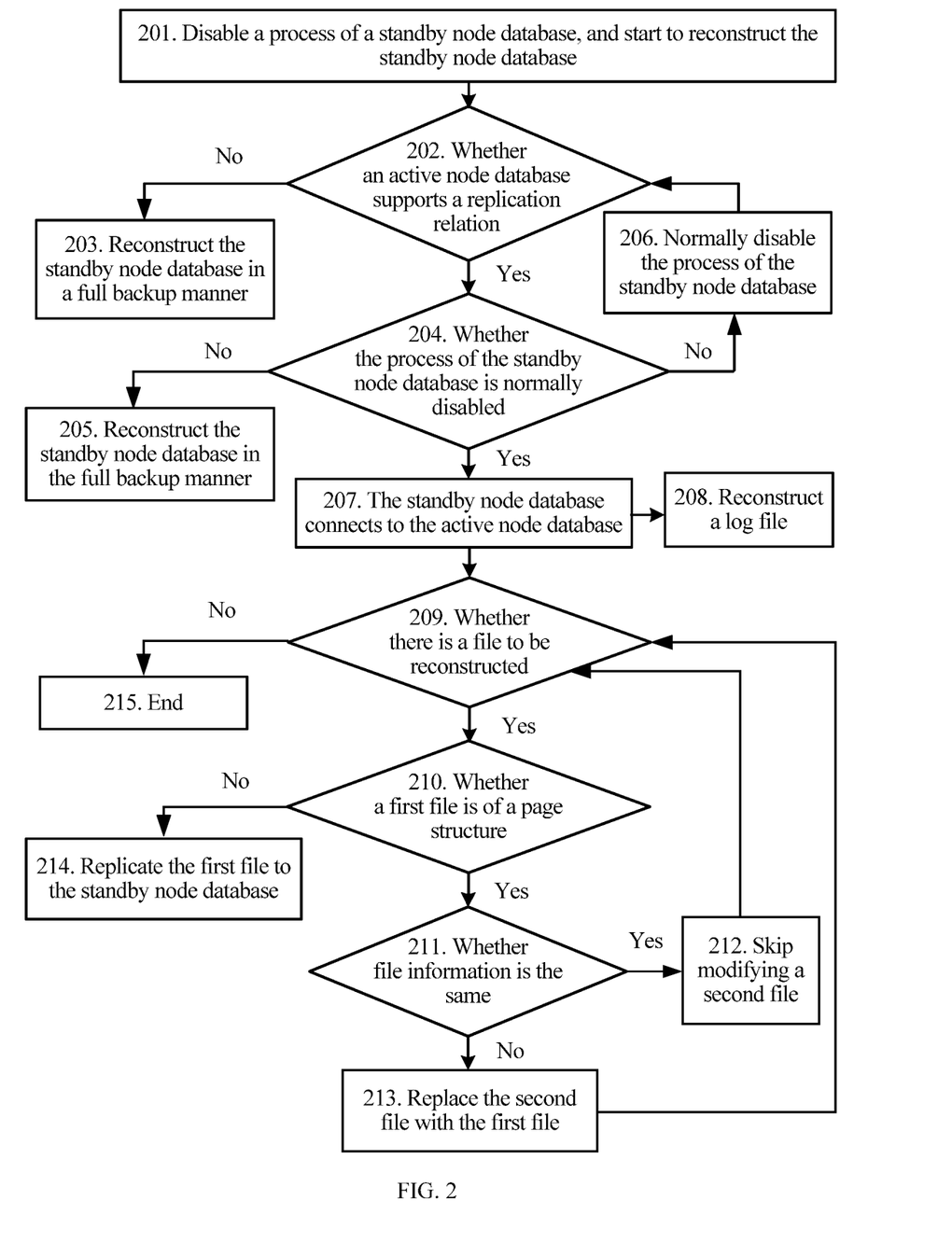
FIG. 2 is a schematic flowchart of a method for reconstructing a standby node database according to another embodiment of the present disclosure.

FIG. 2 is a schematic flowchart of a method for reconstructing a standby node database according to another embodiment of the present disclosure.

Step 201: Disable a process of a standby node database and start to reconstruct the standby node database.

In a process of a two-node cluster hot backup of a database, a log file stored by an active node database is limited. When a replication speed of the standby node database is excessively slow, redoing of the standby node database is excessively slow, a network is broken down, or the like, the standby node database cannot replicate a required log file from the active node database. In this case, a log stream replication mechanism stops and the standby node database needs to be reconstructed. First, the process of the standby node database is disabled to start to reconstruct the database.

Step 202: Determine whether an active node database supports a replication relationship.

That the active node database does not support the replication relationship includes that the active node database once enabled a Nologging mode and the standby node database does not match the active node database. The active node database may enable the Nologging mode to upgrade an application database. Therefore, the standby node database cannot learn whether the active node database is modified or which modification is made to the active node database. In this case, the standby node database cannot be reconstructed in an incremental backup manner. If the active node database once enabled the Nologging mode, it may be considered that the active node database does not support the replication relationship. In addition, the active node database may not match the standby node database, for example, data in the standby node database is not from the active node database, or an identifier of the active node database is not consistent with an identifier (such as an ID) of the standby node database.

Step 203: Reconstruct the standby node database in a full backup manner.

When a determining result of step 202 is that the active node database does not support the replication relationship, the standby node database cannot be reconstructed in the incremental backup manner, but the standby node database can be reconstructed in the full backup manner. All data files and all log files in the active node database may be replaced at corresponding locations in the standby node database to reconstruct the standby node database.

Step 204: Determine whether the process of the standby node database is normally disabled.

When the determining result of step 202 is that the active node database supports the replication relationship, whether the process of the standby node database is normally disabled continues to be determined.

A sequence of the two determining steps, step 202 and step 204, may be interchanged. The sequence of determining whether the active node database supports the replication relationship and determining whether the process of the standby node database is normally disabled in this embodiment of the present disclosure. For example, whether the process of the standby node database is normally disabled may be determined first. When a determining result is that the process of the standby node database is normally disabled, whether the active node database supports the replication relationship continues to be determined. When the determining result is that the process of the standby node database is abnormally disabled, the standby node database is reconstructed in the full backup manner. For example, a data file and a log file at corresponding locations of the standby node database are replaced with a data file and a log file in the active node database, or the standby node database is started up again, and then the process of the standby node database is normally disabled to further determine whether the process of the standby node database is normally disabled and whether the active node database supports the replication relationship.

Step 205: Reconstruct the standby node database in the full backup manner.

When the process of the standby node database is abnormally disabled, a partial write page may exist, and in this case, whether content of a page-structure file of a data file in the active node database is the same as content of a file at a corresponding location of a page-structure file of a data file in the standby node database cannot be determined by comparing file information. Therefore, when the determining result of step 204 is that the process of the standby node database is abnormally disabled, the standby node database is reconstructed in the full backup manner. For example, the data file in the standby node database is replaced with the data file in the active node database and the log file in the standby node database is replaced with the log file in the active node database.

Step 206: Start up the standby node database again and normally disable the process of the standby node database.

When the determining result of step 204 is that the process of the standby node database is abnormally disabled, the standby node database may be started up again and then the process of the standby node database is normally disabled to further go back to step 202 again to determine whether the active node database supports the replication relationship so as to continue to execute a subsequent process.

Step 205 and step 206 are different methods adopted when the determining result of step 204 is that the process of the standby node database is abnormally disabled. When the process of the standby node database is abnormally disabled, step 205 and step 206 are not performed at the same time, but step 205 or step 206 may be performed.

Step 207: The standby node database connects to the active node database.

The standby node database is connected to the active node database to enable two replication procedures of the data file and the log file to reconstruct the standby node database. In the following, a reconstruction procedure of the log file is enabled from step 208 and a reconstruction procedure of the data file is enabled from step 209.

It should be understood that the two reconstruction procedures of the data file and the log file are performed at the same time and do not interfere with each other. The reconstruction of the log file in step 208 may be performed until the entire standby node database is completely reconstructed so as to overwrite the log file in the standby node database by using the log file in the active node database. For example, the log file in the active node database is replicated to the standby node database and to replace the log file in the standby node database.

Step 208: Reconstruct a log file.

Reconstructing the log file is overwriting the log file in the standby node database by using the log file in the active node database.

Step 209: Determine whether there is a data file to be reconstructed.

A data file in a database includes at least one file. When a determining result of step 209 is that there is a page to be reconstructed, all current data files are traversed, and step 210 continues to be performed to continue to reconstruct another file. The another file continues not to be modified or a corresponding file in the standby node database is replaced with a file in the active node database. When the determining result of step 209 is that there is no data file to be reconstructed, for example, all data files in the active node database are completely reconstructed. Then, step 215 is performed to end an entire procedure.

Step 210: Determine whether a first file is a page-structure file.

When the determining result of step 209 is that a data file to be reconstructed in the standby node database exists in the active node database, step 210 is performed to determine whether the first file is a page-structure file, where the first file may be any file of data files in the active node database.

Step 211: Determine whether file information is the same.

When a determining result of step 210 is that the first file is a page-structure file, step 211 is performed to determine whether the file information is the same. It is assumed that a second file is a file that is in the standby node database and is corresponding to the first file in the active node database, Step 211 is performed to determine whether file information of the first file is the same as file information of the second file.

How to compare the file information to determine whether file content is the same is not limited in this embodiment of the present disclosure. The file information in this embodiment of the present disclosure may be a file size, a page quantity of a file, or page version information of a file. The file information may further be other relevant information, and this embodiment of the present disclosure is not limited thereto.

Step 212: Skip modifying a second file.

When a determining result of step 211 is that the file information of the first file is the same as the file information of the second file, file content of the first file may be considered as the same as file content of the second file. In this case, the second file may not be modified. For example, the second file is retained in the standby node database.

After step 211, step 209 is performed to determine whether there is a file to be reconstructed.

Step 213: Replace the second file with the first file.

When the determining result of step 211 is that the file information of the first file is different from the file information of the second file, the file content of the first file may be considered as different from the file content of the second file. In this case, the second file may be replaced with the first file.

It should be understood that, replacing the second file with the first file may be entirely replicating the first file, and replacing entire content of the second file with entire content of the first file.

Replacing the second file with the first file may further include comparing a first page of the first file with a first page of the second file. When the first page of the first file is the same as the first page of the second file, the first page of the second file is not to be modified. When the first page of the first file is different from the first page of the second file, the first page of the second file is replaced with the first page of the first file. Each page of the first file is compared with each page of the second file so that the page is not replicated when the pages are the same, and therefore, network resource consumption of reconstructing the standby node database can be reduced.

It should be understood that, replacing further includes adding or deleting. For example, when the content of the first file is different from that of the second file, the second file may be replaced with the first file. When the standby node database does not include the second file (for example, in a process of a two-node cluster hot backup, the standby node cannot follow the active node and does not replicate the first file in the active node), the first file is added to a location that is in the standby node database and is corresponding to the first file in the active node database. When the standby node database includes more files than the active node database, a redundant file is deleted. The foregoing cases all fall within the coverage scope in this embodiment of the present disclosure.

After step 213, step 209 is performed to determine whether there is a file to be reconstructed.

Step 214: Replicate the first file to the standby node database.

When it is obtained from the determining step 210 that the first file is a non-page-structure file, the first file is replicated to a corresponding location of the standby node database.

Step 215: End.

When the determining result of step 209 is that there is no data file to be reconstructed, and step 208 is completed, step 215 is performed to end the entire procedure.

When the procedure proceeds to step 215 it indicates that the entire process of reconstructing the standby node database is completed.

Figure 3:
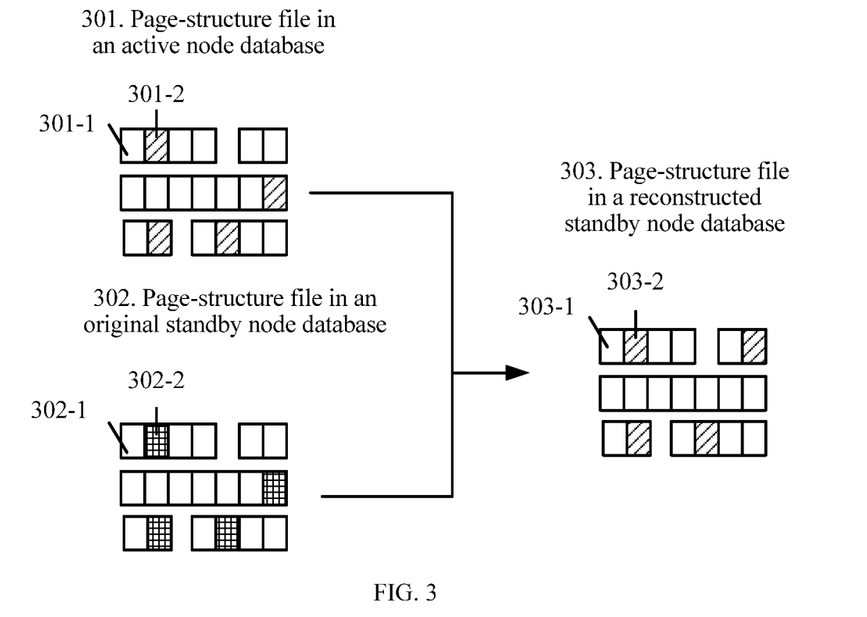
FIG. 3 is a schematic diagram of reconstructing a standby node database based on page version information of an active node database and page version information of the standby node database according to an embodiment of the present disclosure.

FIG. 3 is a schematic diagram of reconstructing a standby node database based on page version information of an active node database and page version information of the standby node database according to an embodiment of the present disclosure.

In FIG. 3, 301 is a page-structure file of a data file in the active node database, 302 is a page-structure file of a data file in an original standby node database, and 303 is a page-structure file of a data file in a reconstructed standby node database. One small rectangle grid indicates one page and pages that are consecutively connected indicate one file. For example, each of 301-1, 301-2, 302-1, 302-2, 303-1, and 303-2 in the figure indicates one page. 301-1, 301-2, and following two consecutive small grids indicate one file. Small blank grids in 301 and 302 indicate that page version information of a same location of a data file in the active node database is the same as page version information of the same location of a data file in the standby node database. For example, in FIG. 3, version information of page 301-1 is the same as that of page 302-1. Small shadow grids in 301 and 302 indicate that page version information of a same location of the data file in the active node database is different from page version information of the same location of the data file in the standby node database. For example, in FIG. 3, version information of page 301-2 is different from that of page 302-2.

In FIG. 3, the file in 301 corresponds to a file at a corresponding location in 302. Each file in 301 corresponds to each file in 302. For example, a first line in 301 includes two files, the first file includes four pages, and the second file includes two pages. A second line includes a seven-page file and a third line includes a two-page file and a four-page file. Each file in 302 corresponds to each file in 301.

In FIG. 3, each page of each file in 301 corresponds to each page of each file in 302. For example, page 301-1 corresponds to page 302-1.

In this embodiment of the present disclosure, the standby node database may be reconstructed by comparing page version information of same locations that are of the data file in the active node database and that are of the data file in the standby node database. If the page version information of the same locations that are of the data file in the active node database and that are of the data file in the standby node database is the same, key content of the pages may be considered as the same. During reconstruction of the standby node database, the page does not need to be processed, for example, the page is not processed. If the page version information of the same locations that are of the data file in the active node database and that are of the data file in the standby node database is different, the key content of the pages may be considered as different. During reconstruction of the standby node database the page of the data file in the standby node database may be replaced with the page of the data file in the active node database.

For example, by comparing the version information of page 301-1 with the version information of page 302-1, it may be obtained that the version information of page 301-1 is the same as the version information of page 302-1. The standby node database does not replicate page 301-1 to replace page 302-1 and does not process page 302-1. For example, page 302-1 is retained in the data file in the standby node database and page 302-1 is used as page 303-1 of a page-structure file in the reconstructed standby node database. By comparing the version information of page 301-2 with the version information of page 302-2 it may be obtained that the version information of page 301-2 is different from the version information of page 302-2. The standby node database uses page 301-2 to overwrite page 302-2 of the page-structure file in the original standby node database. That is, page 301-1 is used as page 303-2 of the page-structure file in the reconstructed standby node database.

Each page of the page-structure file is traversed likewise to compare the page-structure file in the active node database with the page-structure file in the corresponding standby node database. If version information of pages is the same, the page of the data file in the standby node database is not modified. If version information of pages is different, the page of the data file in the standby node database is replaced with the page of the data file in the active node database.

If the data file in the active node database includes a non-page-structure file, a non-page-structure file of the data file in the standby node database is replaced with the non-page-structure file.

Finally, all log files are replicated to the standby node database. For example, log files in the standby node database are overwritten by the log files in the active node database so that the standby node database can be completely reconstructed.

When the standby node database is completely reconstructed, the standby node database may be started up and a replication relationship between the active node database and the standby node database is established again to continue a communication process such as a two-node cluster hot backup of the database.

Figure 4:
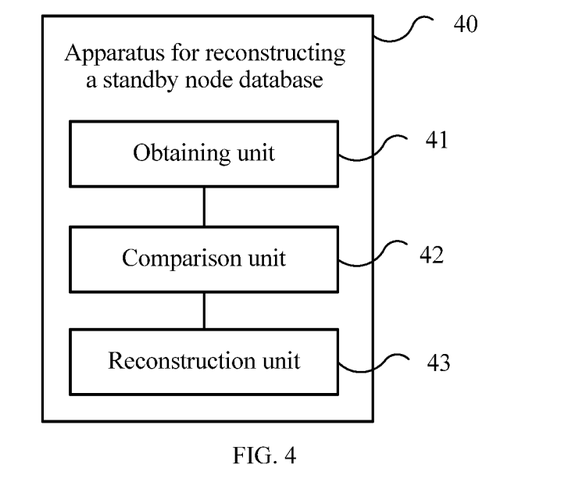
FIG. 4 is a block diagram of an apparatus for reconstructing a standby node database according to an embodiment of the present disclosure.
Figure 5:
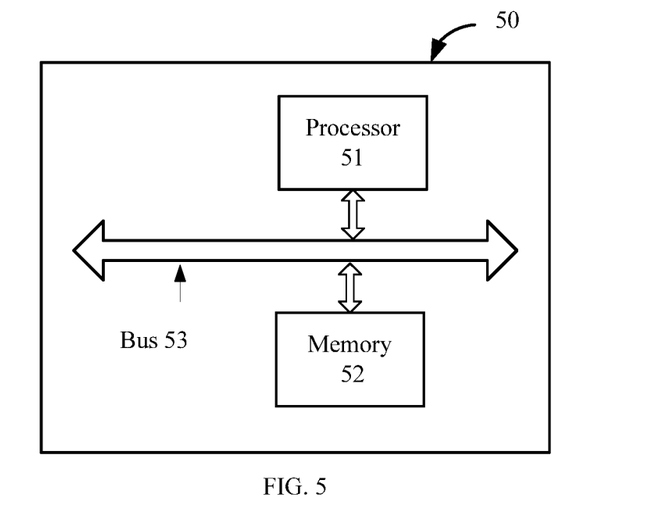
FIG. 5 is a block diagram of an apparatus for reconstructing a standby node database according to another embodiment of the present disclosure.

With reference to FIG. 1, FIG. 2, and FIG. 3, the foregoing describes in detail the methods and the principles for reconstructing a standby node database. With reference to FIG. 4 and FIG. 5, the following describes in detail an apparatus for reconstructing a standby node database.

FIG. 4 is a block diagram of an apparatus for reconstructing a standby node database according to an embodiment of the present disclosure. An apparatus 40 in FIG. 4 includes an obtaining unit 41, a comparison unit 42, and a reconstruction unit 43.

The obtaining unit 41 is configured to obtain file information of a first page-structure file in an active node database and file information of a second page-structure file in a standby node database, where the first page-structure file and the second page-structure file are data files corresponding to each other.

The comparison unit 42 is configured to compare the file information of the first page-structure file with the file information of the second page-structure file that are obtained by the obtaining unit to obtain a comparison result whether the file information is the same.

The reconstruction unit 43 is configured to reconstruct the standby node database according to the comparison result whether file information is the same and that is obtained by the comparison unit.

In this embodiment of the present disclosure, during reconstruction of a standby node database, file information of a first page-structure file in an active node database and file information of a second page-structure file in the standby node database are obtained and compared to determine whether the file information is the same. The standby node database is reconstructed according to a comparison result, thereby avoiding extremely high network resource consumption brought because the standby node database is reconstructed in a full backup manner when there is a large data amount in the active node database and shortening a time for reconstructing the standby node database.

Optionally, in an embodiment of the present disclosure, the reconstruction unit is configured to, when the comparison result whether the file information is the same is that the file information of the first page-structure file is different from the file information of the second page-structure file, replace the second page-structure file with the first page-structure file.

Optionally, in an embodiment of the present disclosure, the file information includes a file size. The comparison unit is configured to compare a file size of the first page-structure file with a file size of the second page-structure file.

Optionally, in an embodiment of the present disclosure, when a comparison result of the file sizes obtained by the comparison unit is different, the reconstruction unit is configured to replace all pages in the second page-structure file with all pages in the first page-structure file.

Optionally, in an embodiment of the present disclosure, the file information includes a page quantity. The comparison unit is configured to compare a page quantity of the first page-structure file with a page quantity of the second page-structure file.

Optionally, in an embodiment of the present disclosure, when a comparison result of the page quantities obtained by the comparison unit is different, the reconstruction unit is configured to replace all pages in the second page-structure file with all pages in the first page-structure file.

Optionally, in an embodiment of the present disclosure, when the comparison result of the file information obtained by the comparison unit is same, the reconstruction unit is configured to compare one by one version information of each page in the first page-structure file with version information of each page in the second page-structure file. For pages of different page version information, a corresponding page in the second page-structure file is replaced with a page in the first page-structure file.

Optionally, in an embodiment of the present disclosure, the page version information includes a log file location or a logical system timestamp.

Optionally, in an embodiment of the present disclosure, the apparatus further includes a determining unit configured to, before the reconstruction unit reconstructs the standby node database according to the comparison result whether the file information is the same, further determine that the active node database supports a replication relationship and a process of the standby node database is normally disabled.

Optionally, in an embodiment of the present disclosure, when the comparison result indicating whether the file information is the same and that is obtained by the comparison unit is same and the comparison result of the page version information is also same, the reconstruction unit is configured to skip modifying the second page-structure file.

The apparatus 40 in FIG. 4 may execute procedures of the methods shown in FIG. 1, FIG. 2, and FIG. 3. To avoid repetition, details are not described herein.

FIG. 5 is a block diagram of an apparatus for reconstructing a standby node database according to another embodiment of the present disclosure. An apparatus 50 includes a processor 51, a memory 52, and a bus system 53. The processor 51 is connected to the memory 52 using the bus system 53, where the memory 52 is configured to store an instruction and the processor 51 is configured to execute the instruction and data stored by the memory 52. A part of the memory 52 may further include a non-volatile random access memory (NVRAM). All components of the apparatus are coupled together by using the bus system 53, where in addition to a data bus, the bus system 53 includes a power bus, a control bus, and a status signal bus. However, for clarity of description, various buses are marked as the bus system 53 in the figure.

The methods disclosed in the foregoing embodiments of the present disclosure may be applied to the processor 51 or implemented by the processor 51. In an implementation process, steps in the foregoing methods may be completed by using an integrated logic circuit of hardware in the processor 51 or an instruction in a form of software. The processor 51 may be a general purpose processor, a digital signal processor, an application-specific integrated circuit, a field programmable gate array or another programmable logic device, a discrete gate or a transistor logic device, or a discrete hardware component, and may implement or execute each method, step and logic block diagram disclosed in the embodiments of the present disclosure. The general purpose processor may be a microprocessor, any conventional processor, or the like. Steps of the method disclosed with reference to the embodiments of the present disclosure may be directly performed by a hardware processor, or may be performed by using a combination of hardware in the processor and a software module. The software module may be located in a mature storage medium in the field, such as a random access memory (RAM), a flash memory, a read-only memory (ROM), a programmable read-only memory (PROM), an electrically-erasable programmable memory, or a register. The storage medium is located in the memory 52. The processor 51 reads information in the memory 52, and completes steps of the foregoing method in combination with hardware of the processor 51.

The processor 51 may obtain file information of a first page-structure file in an active node database and file information of a second page-structure file in a standby node database, where the first page-structure file and the second page-structure file are data files corresponding to each other. The file information of the first page-structure file and the file information of the second page-structure file that are obtained by the processor 51 are compared to obtain a comparison result whether the file information is the same. The standby node database is reconstructed according to the comparison result whether the file information is the same.

In this embodiment of the present disclosure, during reconstruction of a standby node database, file information of a first page-structure file in an active node database and file information of a second page-structure file in the standby node database are obtained and compared to determine whether the file information is the same. The standby node database is reconstructed according to a comparison result, thereby avoiding extremely high network resource consumption brought because the standby node database is reconstructed in a full backup manner when there is a large data amount in the active node database and shortening a time for reconstructing the standby node database.

Optionally, in an embodiment of the present disclosure, the processor 51 is configured to, when the comparison result whether the file information is the same is that the file information of the first page-structure file is different from the file information of the second page-structure file, replace the second page-structure file with the first page-structure file.

Optionally, in an embodiment of the present disclosure, the processor 51 is configured to, when the file information includes a file size, compare a file size of the first page-structure file with a file size of the second page-structure file.

Optionally, in an embodiment of the present disclosure, the processor 51 is configured to, when a comparison result of the file sizes obtained by the comparison unit is different, replace all pages in the second page-structure file with all pages in the first page-structure file.

Optionally, in an embodiment of the present disclosure, the processor 51 is configured to, when the file information includes a page quantity, compare a page quantity of the first page-structure file with a page quantity of the second page-structure file.

Optionally, in an embodiment of the present disclosure, the processor 51 is configured to, when a comparison result of the page quantities obtained by the comparison unit is different, replace all pages in the second page-structure file with all pages in the first page-structure file.

Optionally, in an embodiment of the present disclosure, the processor 51 is configured to, when the comparison result of the file information obtained by the comparison unit is same, compare one by one version information of each page in the first page-structure file with version information of each page in the second page-structure file. For pages of different page version information, a corresponding page in the second page-structure file is replaced with a page in the first page-structure file.

Optionally, in an embodiment of the present disclosure, the page version information includes a log file location or a logical system timestamp.

Optionally, in an embodiment of the present disclosure, the processor 51 is configured to, before a reconstruction unit reconstructs the standby node database according to the comparison result whether the file information is the same and obtained by a first comparison unit, determine that the active node database supports a replication relationship and a process of the standby node database is normally disabled.

Optionally, in an embodiment of the present disclosure, the processor 51 is configured to, when the comparison result whether the file information is the same and that is obtained by the comparison unit is same and the comparison result of the page version information is also same, skip modifying the second page-structure file.

The apparatus 50 can implement steps of the foregoing method embodiment. To avoid repetition, details are not described.

It should be understood that, "an embodiment" or "one embodiment" mentioned in the entire specification means that a specific feature, structure, or characteristic related to the embodiments is included in at least one embodiment of the present disclosure. Therefore, "in an embodiment" or "in one embodiment" appearing everywhere in the entire specification may not necessarily refer to a same embodiment. In addition, these specific features, structures, or characters may be combined in one or more embodiments in any appropriate manner.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

It should be understood that in the embodiments of the present disclosure, "B corresponding to A" indicates that B is associated with A, and B may be determined according to A. However, it should further be understood that determining A according to B does not mean that B is determined according to A only; that is, B may also be determined according to A and/or other information.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present disclosure.

Methods or steps described in the embodiments disclosed in this specification may be implemented by hardware, a software program executed by a processor, or a combination thereof. The software program may reside in a RAM, a memory, a ROM, an electrically programmable ROM, an electrically erasable programmable ROM, a register, a hard disk, a removable disk, a compact disc ROM (CD-ROM), or any other form of storage medium known in the art.

The present disclosure is described in detail with reference to the accompany drawings and in combination with the embodiments, but the present disclosure is not limited thereto. Various equivalent modifications or replacements can be made to the embodiments of the present disclosure by a person of ordinary skill in the art without departing from the spirit and essence of the present disclosure, and the modifications or replacements shall fall within the scope of the present disclosure.

What is claimed is:

1. A method for reconstructing a standby node database comprising:
    obtaining first file information of a first page-structure file in an active node database and second file information of a second page-structure file in the standby node database, wherein the first page-structure file and the second page-structure file are data files that correspond to each other;
    comparing the first file information with the second file information to obtain a comparison result that indicates whether the first file information is the same as the second file information, wherein the first file information and the second file information comprise a corresponding page quantity and a corresponding file size;
    determining whether the active node database supports a replication relationship with the standby node database that indicates the standby node database cannot use incremental backup; and
    reconstructing the standby node database in a full backup manner in response to the comparison result indicating the first file information is different than the second file information and the active node database does not support the replication relationship, wherein the first page-structure file is a first file size and the second page-structure file is a second file size, and wherein reconstructing the standby node database in the full backup manner comprises replacing all pages in the second page-structure file with all pages in the first page-structure file in response to the first file size being different than the second file size.

2. The method of claim 1, wherein reconstructing the standby node database according to the comparison result comprises replacing the second page-structure file with the first page-structure file in response to the comparison result indicating the first file information of the first page-structure file is different from the second file information of the second page-structure file.

3. The method of claim 1, wherein comparing the first file information of the first page-structure file with the second file information of the second page-structure file comprises comparing the first file size of the first page-structure file with the second file size of the second page-structure file.

4. The method of claim 3, wherein reconstructing the standby node database further comprises replacing all pages in the second page-structure file with all pages in the first page-structure file in response to a first page quantity is different than a second page quantity, wherein the first page-structure file comprises the first page quantity and the second page-structure file comprises the second page quantity.

5. The method of claim 3, wherein in response to the comparison result indicating the first file size is the same as the second file size, reconstructing the standby node database comprises:
   comparing one by one version information of each page in the first page-structure file with version information of each page in the second page-structure file; and
   replacing a corresponding page in the second page-structure file with a page in the first page-structure file for pages of different page version information.

6. The method of claim 5, wherein the version information of each page in the first page-structure file and the second page-structure file comprises a log file location or a logical system timestamp.

7. The method of claim 5, wherein the second page-structure file is not modified in response to the comparison result indicating the first file size is the same as the second file size and a comparison result of the version information of each page in the first page-structure file with the second page-structure file indicating the version information is the same.

8. The method of claim 1, wherein the first file information comprises a first page quantity and the second file information comprises a second page quantity, and wherein comparing the first file information of the first page-structure file with the second file information of the second page-structure file comprises comparing the first page quantity with the second page quantity.

9. The method of claim 1, wherein before reconstructing the standby node database according to the comparison result, the method further comprises determining that the active node database supports a replication relationship and a process of the standby node database is normally disabled.

10. An apparatus for reconstructing a standby node database, wherein the apparatus comprises:
    memory; and
    a processor coupled to the memory and configured to:
      obtain first file information of a first page-structure file in an active node database and second file information of a second page-structure file in the standby node database, wherein the first page-structure file and the second page-structure file are data files that correspond to each other;
      compare the first file information with the second file information to obtain a comparison result that indicates whether the first file information is the same as the second file information, wherein the first file information and the second file information comprise a corresponding page quantity and a corresponding file size;
      determine whether the active node database supports a replication relationship with the standby node database that indicates the standby node database cannot use incremental backup; and
      reconstruct the standby node database in a full backup manner in response to the comparison result indicating the first file information is different than the second file information and the active node database does not support the replication relationship, wherein reconstructing the standby node database in the full backup manner includes replacing all pages in the second page-structure file with all pages in the first page-structure file in response to a first file size being different than a second file size, wherein the first page-structure file is the first file size and the second page-structure file is the second file size.

11. The apparatus of claim 10, wherein the processor is configured to replace the second page-structure file with the first page-structure file in response to the comparison result indicating the first file information of the first page-structure file is different than the second file information of the second page-structure file.

12. The apparatus of claim 10, wherein the processor is further configured to compare the first file size of the first page-structure file with the second file size of the second page-structure file.

13. The apparatus of claim 12, wherein the processor is further configured to replace all pages in the second page-structure file with all pages in the first page-structure file in response to a first page quantity being different than a second page quantity, wherein the first page-structure file comprises the first page quantity and the second page-structure file comprises the second page quantity.

14. The apparatus of claim 13, wherein the processor is further configured to compare the first page quantity with the second page quantity.

15. The apparatus of claim 12, wherein in response to the comparison result indicating the first file size is the same as the second file size, the processor is further configured to:
    compare one by one version information of each page in the first page-structure file with version information of each page in the second page-structure file; and
    replace a corresponding page in the second page-structure file with a page in the first page-structure file for pages of different page version information.

16. The apparatus of claim 15, wherein the version information of each page in the first page-structure file and the second page-structure file comprises a log file location or a logical system timestamp.

17. The apparatus of claim 15, wherein the processor is further configured to skip modifying the second page-structure file in response to the comparison result indicating the first file size is the same as the second file size and a comparison result of the version information of each page in the first page-structure file with the second page-structure file indicating that the version information is the same.

18. The apparatus of claim 10, wherein the processor is further configured to determine that the active node database supports a replication relationship and a process of the standby node database is normally disabled before the processor reconstructs the standby node database according to the comparison result indicating whether the first file information is the same as the second file information.

* * * * *